US00RE37760E

(19) United States
(12) Reissued Patent
Mathison et al.

(10) Patent Number: US RE37,760 E
(45) Date of Reissued Patent: Jun. 25, 2002

(54) DUST DISPENSING SYSTEM FOR USE IN SQUEEZE-TYPE DUST DISPENSERS

(75) Inventors: Tom B. Mathison, North Lauderdale; Joseph B. Budz, Coral Springs, both of FL (US)

(73) Assignee: Pestop Commercial Pest Prevention, North Lauderdale, FL (US)

(21) Appl. No.: 09/458,052

(22) Filed: Dec. 9, 1999

Related U.S. Patent Documents

Reissue of:
(64) Patent No.: 5,971,234
Issued: Oct. 26, 1999
Appl. No.: 09/143,337
Filed: Aug. 28, 1998

(51) Int. Cl.[7] ..... B05B 11/06
(52) U.S. Cl. ..... 222/633; 222/211
(58) Field of Search ..... 222/209, 211, 222/632, 633, 382, 464.2

(56) References Cited

U.S. PATENT DOCUMENTS

| | | | | | |
|---|---|---|---|---|---|
| 1,776,489 | A | * | 9/1930 | Cobb | 222/633 |
| 2,450,205 | A | * | 9/1948 | Rose | 222/632 |
| 2,840,277 | A | * | 6/1958 | Bach | 222/633 |
| 2,896,825 | A | * | 7/1959 | Jackson | 222/211 |
| 2,981,444 | A | * | 4/1961 | Root | 222/193 |
| 3,241,726 | A | * | 3/1966 | Chester | 222/211 |
| 3,323,689 | A | * | 6/1967 | Elmore | 222/209 X |
| 3,601,317 | A | * | 8/1971 | Genantonio | 222/211 X |
| 4,007,858 | A | * | 2/1977 | Shay | 222/633 |
| 4,014,468 | A | * | 3/1977 | Silverman et al. | 239/327 |
| 4,015,753 | A | * | 4/1977 | Bennett | 222/193 |
| 4,087,023 | A | * | 5/1978 | Szczepanski | 222/209 |
| 4,091,966 | A | * | 5/1978 | Laauwe | 222/211 |
| 4,261,488 | A | * | 4/1981 | Bennett | 222/633 |
| 4,307,823 | A | * | 12/1981 | Heiss et al. | 222/633 |
| 4,356,941 | A | * | 11/1982 | McRoskey | 222/632 |
| 4,526,305 | A | * | 7/1985 | Lykes | 222/632 |

* cited by examiner

*Primary Examiner*—Robert M. Fetsuga
(74) *Attorney, Agent, or Firm*—Klehr, Harrison, Harvey, Branzburg & Ellers LLP; John F. Letchford

(57) ABSTRACT

A dust dispensing system comprised of a dip tube enclosing a much smaller outlet tube, both tubes fitted to countersunk holes in the plug base. A path for powder and air is created within the wall of a flexible container beginning at the area within the container through the longitudinal vent holes at opposite ends of the dip tube toward the inside center of the dip tube where two air/dust streams collide venting through the inward longitudinal opening of the outlet tube which is disposed at the point of convergence of the colliding streams and then the mixture continues to flow under pressure through the outlet tube and out the exit nozzle each time the container is squeezed. This action is repetitive and fully operational regardless of the device's orientation.

20 Claims, 2 Drawing Sheets

DUST DISPENSING SYSTEM FOR USE IN SQUEEZE-TYPE DUST DISPENSERS

Matter enclosed in heavy brackets [ ] appears in the original patent but forms no part of this reissue specification; matter printed in italics indicates the additions made by reissue.

INTRODUCTION

This invention relates to dust/air pick-up systems for squeeze-type dust dispensers. It provides a means to apply light coatings of powdered material with a high degree of accuracy at relatively great distances regardless of the dispensers attitude.

BACKGROUND OF THE INVENTION

Powders have been in use for hundreds of years and there are patents for dust dispensers dating back to the 19th century, for example, Fitchtenberg's, Insect Destroyers (Patent No. 156, 696), patented in 1874. Safer powdered pesticide products for use in homes, gardens, institutions and industries enjoy increasing popularity. Powdered products of other types including foot powders, herbicides, powders used in manufacturing, in mold releases, etc. currently utilize a wide array of dispensers to apply them.

U.S. Pat. No. 2,450,205 shows a compressible powder dispenser. Positioned within the casing and supported by the top member is the powder exit tube, the upper end of the tube being open outwardly at the casing and the lower end of the tube being positioned above the bottom member. Positioned longitudinal to the exit tube and clamped in place is an air-circulating tube and positioned over each end of the air-circulating tube is a disc of air-pervious, powder impervious material to prevent the passage of powder into the air-circulating tube.

U.S. Pat. No. 2,896,825 discloses another type of dispensing device. A perforated open-ended tube of relatively large diameter is inserted into the cap and extends downward into the powder. A flange in the neck of the container acts as a sealing ring.

U.S. Pat. No. 2,981,444 discloses another squeeze-to-use type apparatus. This canister-type dispenser has a feed tube of slightly longer length than the interior of the container. The feed tube has a plurality of holes and when pressure is applied to the container the powder is forced through the holes upward into the mixing chamber and then through the discharge orifice.

U.S. Pat. No. 4,015,753 shows another squeeze-type powder dispensing apparatus. This device employs a vertical dip tube open at the top and bottom ends. While the bottom end of the dip tube is disposed in powder the top end is in communication with the bottom of a hollow spherical mixing chamber in the top of the container. A shorter air tube adjacent to the dip tube is also in communication with the mixing chamber. The powder flows up the dip tube and mixes with air in the mixing chamber before being expelled from the discharge port.

U.S. Pat. No. 4,091,966 discloses another squeeze-type powder dispenser. This patent shows parallel tubes extending down into a cup-like connection fitting at the bottom the dispenser, the bottom of this cup-like fitting having an orifice opening into powder if upright and air if inverted. The parallel tubes are of different lengths with the top of one of the tubes opening into the top of the container and the top of the other tube in communication with the discharge cap.

U.S. Pat. No. 4,261,488 discloses another squeeze container which utilizes a dip tube with a spherical mixing chamber located above it. A cup located at the bottom of the dip tube and in communication with its opening supplies the powdered product up the tube to the mixing chamber and then dispenses powder from the discharge conduit when the container is squeezed.

U.S. Pat. No. 4,307,823 shows a squeeze container with a dip tube connected at its upper end to the orifice of the dispensing head and extending downward at a position spaced from the bottom of the container. A second shorter air tube is positioned around the first tube with its upper end in communication with the top of the container and the air space in the top of the container and its lower end just short of the bottom of the first tube. When pressure is applied, air is forced from the top of the container down in-between the tubes and mixes with the powder at the base of the dip tube and forces the powder up to the dispensing head.

U.S. Pat. No. 4,356,941 shows a squeeze-type dispensing apparatus that utilizes a single continuous dip tube with a plurality of holes which is looped to provide a U-shaped bend positioned in the bottom of the container with one end of the tube in communication with a dispensing nozzle and a closed end of the tube in communication with the interior upper end of the container.

U.S. Pat. No. 4,526,305 discloses a powder distributing apparatus which uses a hollow slotted plug to mix incoming air and powdered material from a collapsible container when squeezed. A cap located on the top of container allows the operator to select the quantity and particle size of the powder dispensed.

Dust dispensing apparatus in the form of designed instruments as well as container applicators employing materials and reliant on restrictive elements are currently in use in increasing numbers. To produce an even flow of the air/dust mixture while maintaining a relatively constant ratio of air to dust and maximizing dissociation of the dust particles is the objective of these devices.

The shortcomings of some of these devices is that their small passages tend to collect and pack dust causing blockage to occur. Others fail to provide adequate movement of air/dust to provide adequate and repeatable flow of material from their exit tubes. Still others will operate only in an upright position while others need to be pointed downward.

The present invention provides a system by which a simple squeeze-type powder dispenser, employable where light dusting is desirable, requiring very low effort relative to the volume of mixture discharged, achieves particle dissociation and dissemination beyond prior art and beyond currently available dispensers.

SUMMARY OF INVENTION

This invention consists of a tube within a tube pick-up system. An outlet tube resides within a longer, larger diameter dip tube, both secured to the base of a bored-through plug by countersunk holes in the plug's base. Openings in the dip tube's opposite ends correspond indirectly to openings in the bottom of the outlet tube midway of the dip tube. When a highly flexible container comprised of an annular wall, a base, a neck and accepts the plug with tubes in place is squeezed, air and dust flow rapidly into the dip tube from both ends and converge at the outlet tube entrance on through the exit nozzle without regard to the container's orientation.

The object of this invention is to achieve the greatest possible consistency of dispersion of solid particle dusts in the air/dust mixture with the greatest possible directability, range and efficiency of operation in a one-hand, 360° operational dusting device.

Another object of this invention is to provide these facilities in a device which may be inexpensively produced from available materials and requiring production of just one simple part.

DETAILED DESCRIPTION OF DRAWINGS

Figure 1:
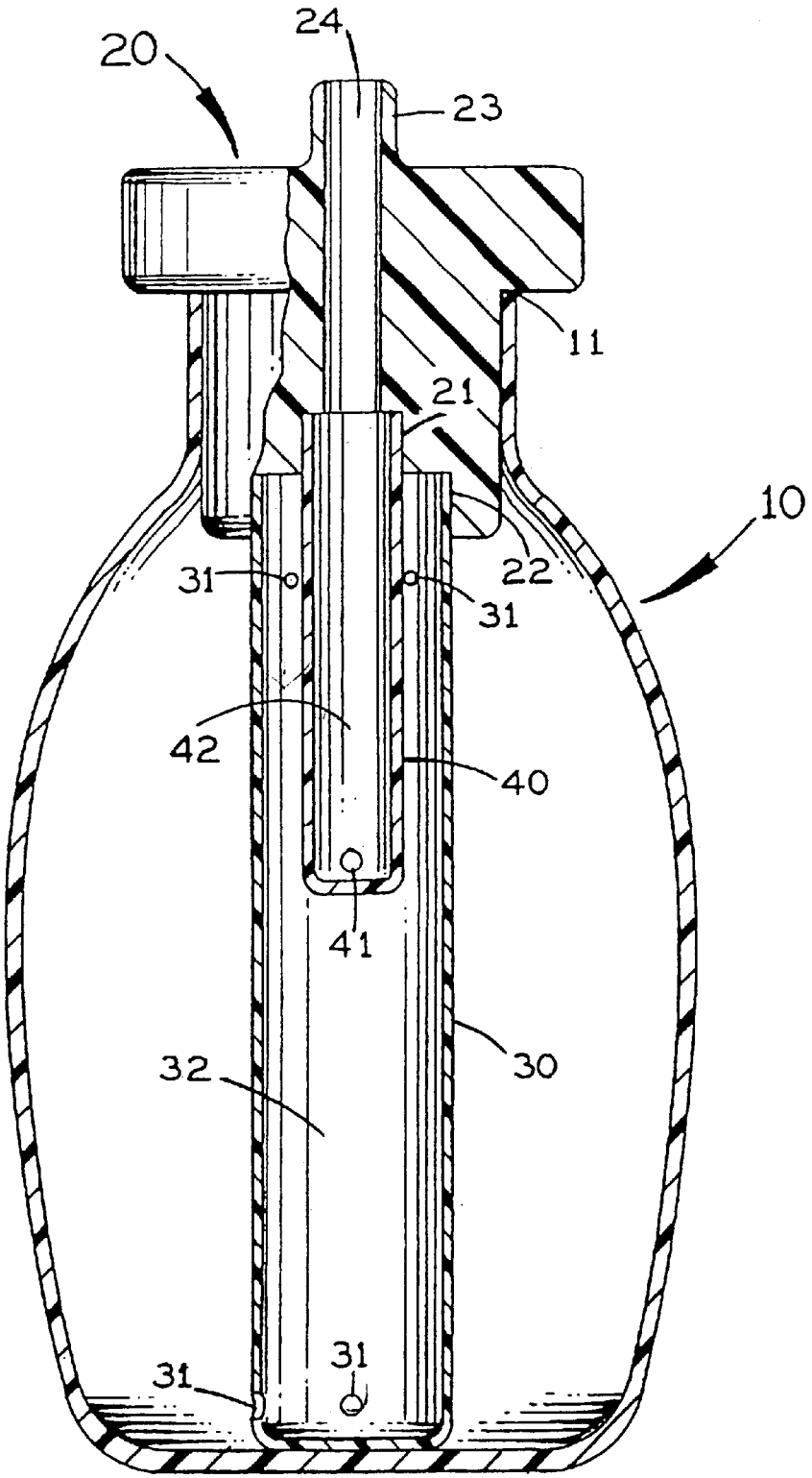
FIG. 1 is a vertical cross-sectional view of the present invention.

Referring to FIG. 1, the present invention consists of only four parts: a squeeze-type container 10, a plug 20, a dip tube 30 and an outlet tube 40.

The squeeze-type container 10 is made of a resilient material and collapsible under pressure. The container 10 may be of any common to the market as long as the mouth/throat 11 is of a size and shape to accept a plug creating an airtight seal. The container 10 being sufficiently flexible so that it may be readily squeezed with one hand by the average person forcing the contents through the system and out the discharge nozzle 23. The container 10 must be resilient enough to return rapidly to its original shape while drawing replacement air inwardly as it returns to that original shape. Containers of this kind are well-known in the marketplace and are used where it is desired to force a fluid powder onto surfaces and into cracks, crevices and voids.

Figure 2:
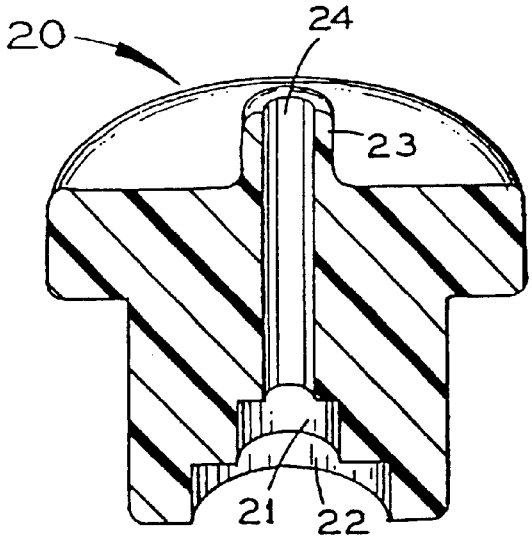
FIG. 2 is a vertical cross-sectional view of the plug.
Figure 3:
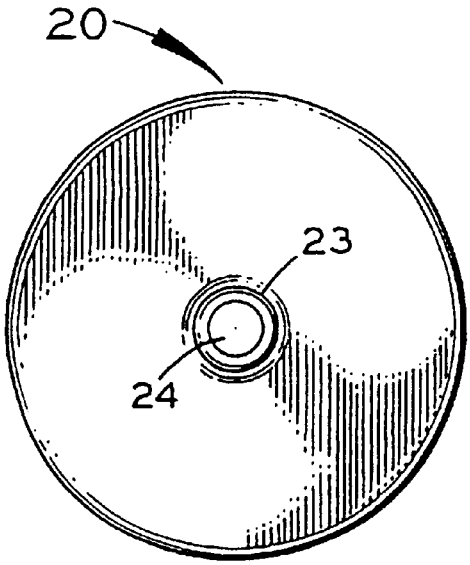
FIG. 3 is a top view of the plug.
Figure 4:
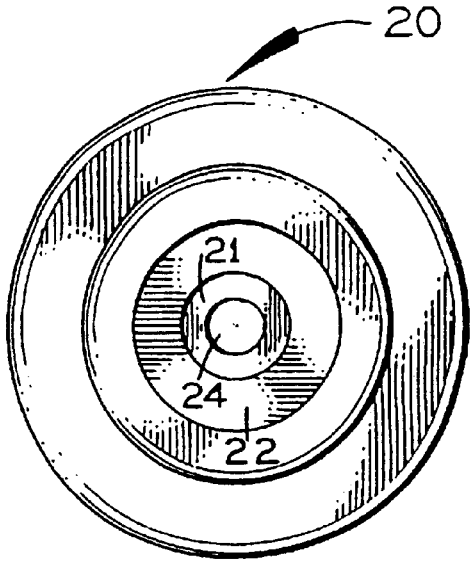
FIG. 4 is a bottom view of the plug.

The plug 20, as shown in FIG. 2, disposed in an upright position shows an outlet nozzle 23 at its upper end, a large diameter countersunk hole 22 and a concentrically located smaller deeper countersunk hole 21 in its base at the lower end. The first, larger countersunk hole 22 in the base of the plug, its diameter being the outside diameter of the dip tube 30, extends in an upward direction far enough that it holds the dip tube firmly in place. The second, smaller countersunk hole 21, its diameter being the outside diameter of the outlet tube 40, provides a cavity which holds the outlet tube 40 securely in place and in communication with the bore 24 in the plug 20. The plug 20 may be secured to the container 10 by corresponding interlocking grooves, by screw threads or by compression.

Referring to FIG. 1, the dip tube 30 extends downward from the base of the plug 20 to the bottom of the container 10 where it terminates. The dip tube 30 is closed at its lower end and has longitudinally disposed vent holes 31 near both its top and bottom ends. The dip tube 30 is held in place by a countersunk hole 22 in the base of the plug 20.

Referring to FIG. 1, the outlet tube 40, which is half the length of the dip tube 30, is also held in place by a countersunk hole 21 in the plug's 20 base and communicates in-line with the bore 24 in the plug. The outlet tube 40 is also closed at its lower end, but has at least one longitudinally disposed vent hole 41 near that closed end. The outlet tube 40, being of smaller diameter than the dip tube 30, is located in concentric fashion within the dip tube 30.

In practice, the squeeze-type container 10 partly filled with powder encloses the outlet tube 40 and the dip tube 30, while securing the air tight plug 20 in its mouth/throat 11.

When the container 10 is squeezed, air compressed in the container 10 mixes with displaced powder causing dust particles suspended in fluid compressed air to accelerate through restrictive vent holes 31 in the dip tube's 30 top and bottom ends. Convergent streams of air within the dip tube 30 collide causing particle collision, particle deflection and air turbulence near its center in chamber 32 at which point resides the vent hole(s) 41 in the outlet tube 40. The air/dust mixture alternately accelerates through the vent hole(s) 41 and decelerates into the outlet chamber 42 in the same manner that the mixture accelerated through the dip tube's vent holes 31 and decelerated and deflected within chamber 32 on its way to the outlet tube 40. The air/dust mixture continues under diminishing pressure upward through the bore 24 in the plug 20 and out the exit nozzle 23 in a smoke-like cloud of well dispersed dust particles.

Upon relaxing the container's 10 distorted walls the resilient material creates a vacuum within as it returns to its original shape and dimensions. The returning air flows through the same openings as the dust/air mixture was expelled from but in the opposite direction. This action alternating with the compression/expulsion action allows repetitive operation due to the loosening and vent clearing aspects effected by the returning air. Continuous circuitous fluidity of movement within this system is ensured by the absence of pure product conduits which tend to clog at their openings or along their interior passages.

This system functions during repetitive use, is directional to approximately six feet and fully operable regardless of the container's 10 orientation. Provision of longitudinally disposed vent holes 31 at both ends of the dip tube 30 and at least one longitudinally disposed vent hole 41 near the outlet tube's 40 lower terminus midway inside the dip tube 30 between the dip tube's 30 top and bottom ends comprise the dispensing system for which present art applies.

What is claimed is:

1. A dust mixing and dispensing device of the character described, the combination including:

a. a squeeze-type container being sufficiently flexible so that it may be readily squeezed by the user and having a mouth/throat as means for receiving powdered product and accepting a plug;

b. a plug being of sufficient diameter as to create an airtight seal when inserted into the mouth/throat of the container and having an exit nozzle at its upper end and two countersunk holes of differing diameters and sunk to different depths in its bottom end, in addition to being hollow through its axial center;

c. a hollow outlet tube open at its top end, closed at its bottom end and having at least one longitudinally disposed vent hole near its closed bottom-end, said outlet tube, its open top end seated in the smaller deeper countersunk hole in the plug being in communication with the hollow axial center through the plug;

d. a hollow dip tube open at its top end, closed at its bottom end with vent holes longitudinally disposed near its upper and lower ends, said dip tube, being of a much larger diameter than the outlet tube and twice its length so as to fit over the outlet tube thereby enclosing it when seated in the larger diameter countersunk hole in the plug and extending to the bottom of the container;

e. above parts align in such a manner that by squeezing of said container disturbed dust mixes with the air in the container while simultaneously forcing the dust/air mixture through restrictive vent holes located at both ends of the dip tube then converging toward the dip tube's center where more mixing action is effected by particle collision and by deflection against the walls of the tubes before the mixture is forced into the outlet tube's inward opening strategically located at the dip tube's midway point where the dust/air particulate is mixed a third time prior to exiting through the discharge nozzle in a smoke-like cloud.

2. A device as described in claim 1 comprised of a half-filled and plugged flexible container, the top of the dip tube inserted in the plug base extends to the bottom of the container where it closes just below the longitudinal vent holes which are exposed to powdered product, corresponding longitudinal vent holes near the top supplying both dust and air indirectly to the outlet tube's longitudinal inward opening located near the mid-point inside the dip tube's length, this combination of parts providing three distinct and separate mixing chambers of decreasing volume from the first chamber created in the area within the wall of the container, to the second chamber consisting of the space within the dip tube, then inward to the third chamber's space within the outlet tube provides a path through the system whereby powder is swept by air currents accelerating through restrictive vent openings at both ends of the dip tube creating two streams of dust mixture which rush together near the mid-point inside of the dip tube's length causing a mixing action due to particle collision, particle deflection and turbulence, the mixture next forced through the outlet tube's inward longitudinal vent hole, said fluid mixture passing up the outlet tube and finally dispersed through the exit orifice as a smoke-like cloud of dissociated particles each time the container is squeezed.

3. A device as described in claim 1 comprised of a half-filled and plugged flexible container, the top of the dip tube inserted in the plug base extends to the bottom of the container where it closes just below the longitudinal vent holes which are exposed to powdered product and corresponding longitudinal vent holes near the top supplying both dust and air indirectly to the outlet tube's longitudinal inward opening located near the mid-point inside the dip tube's length, this combination of parts aligning the outlet tube within the dip tube, both tubes availed of longitudinal openings, provides a device that will not spill powder when inverted and may be continuously operated regardless of orientation because powder in the container is shrouded by the dip tube from the outlet tube, which disposed of longitudinal holes, is not disposed to powder that will fall from the dip tube when the device is inverted.

4. A dust mixing and dispensing device of the character described, the combination including:

a. a squeeze-type container being sufficiently flexible so that it may be readily squeezed by the user and having a mouth/throat as means for receiving powdered product and accepting a plug;

b. a plug being of sufficient diameter as to create an airtight seal when inserted into the mouth/throat of the container and having an exit nozzle at its upper end and two countersunk holes of differing diameters and sunk to different depths in its bottom end, in addition to being hollow through its axial center;

c. a hollow outlet tube open at its top end, closed at its bottom end and having at least one longitudinally disposed vent hole near its closed bottom-end, said outlet tube, its open top end seated in the smaller deeper countersunk hole in the plug being in communication with the hollow axial center through the plug;

d. a hollow dip tube open at its top end, closed at its bottom end with vent holes longitudinally disposed near its upper and lower ends, said dip tube, being of a much larger diameter than the outlet tube and twice its length so as to fit over the outlet tube thereby enclosing it when seated in the larger diameter countersunk hole in the plug and extending to the bottom of the container.

*5. A powdered product mixing and dispensing device comprising:*

*a squeeze-type container for receiving powdered product;*

*a plug creating an airtight seal with said container, said plug having a bore therethrough;*

*a hollow outlet tube open at its top end and closed at its bottom end, said top end of said outlet tube being seatingly held by said plug, said outlet tube defining a first chamber communicating with said bore;*

*a hollow dip tube open at its top end and closed at its bottom end, said top end of said dip tube being seatingly held by said plug whereby said dip tube defines a second chamber; and*

*vent holes in said outlet tube and said dip tube, said vent holes providing communication between said first and second chambers and between said second chamber and the interior of said container.*

*6. The device of claim 5 wherein said dip tube is dimensioned to fit over said outlet tube.*

*7. The device of claim 5 wherein said vent holes comprise at least one vent hole in said outlet tube and a plurality of vent holes in said dip tube.*

*8. The device of claim 7 wherein said vent holes in said dip tube are disposed near its top end.*

*9. The device of claim 7 wherein said vent holes in said dip tube are disposed near its bottom end.*

*10. The device of claim 7 wherein said vent holes in said dip tube are disposed near its top and bottom ends.*

*11. The device of claim 10 wherein said at least one vent hole in said outlet tube is longitudinally disposed between said vent holes in said dip tube.*

*12. The device of claim 11 wherein said at least one vent hole in said outlet tube is longitudinally disposed substantially centrally between said vent holes in said dip tube.*

*13. A powdered product mixing and dispensing device comprising:*

*a squeeze-type container for receiving powdered product;*

*a plug creating an airtight seal with said container, said plug having a bore therethrough;*

*a hollow outlet tube having an open top end, said top end of said outlet tube being seatingly held by said plug, said outlet tube defining a first chamber communicating with said bore;*

*a hollow dip tube open having an open top end, said top end of said dip tube being seatingly held by said plug, said dip tube defining a second chamber; and*

*vent holes in said outlet tube and said dip tube, said vent holes providing communication between said first and second chambers and between said second chamber and the interior of said container.*

*14. The device of claim 13 wherein said dip tube is dimensioned to fit over said outlet tube.*

*15. The device of claim 13 wherein said vent holes comprise at least one vent hole in said outlet tube and a plurality of vent holes in said dip tube.*

*16. The device of claim 15 wherein said vent holes in said dip tube are disposed near its top end.*

*17. The device of claim 15 wherein said vent holes in said dip tube are disposed near its bottom end.*

*18. The device of claim 15 wherein said vent holes in said dip tube are disposed near its top and bottom ends.*

*19. The device of claim 18 wherein said at least one vent hole in said outlet tube is longitudinally disposed between said vent holes in said dip tube.*

*20. The device of claim 19 wherein said at least one vent hole in said outlet tube is longitudinally disposed substantially centrally between said vent holes in said dip tube.*

* * * * *